(12) United States Patent
Donier et al.

(10) Patent No.: US 10,776,420 B2
(45) Date of Patent: Sep. 15, 2020

(54) FINGERPRINT CLUSTERING FOR CONTENT-BASED AUDIO RECOGNITION

(71) Applicant: Spotify AB, Stockholm (SE)

(72) Inventors: Jonathan Donier, Stockholm (SE); Till Hoffmann, Stockholm (SE)

(73) Assignee: Spotify AB, Stockholm (SE)

( * ) Notice: Subject to any disclaimer, the term of this patent is extended or adjusted under 35 U.S.C. 154(b) by 124 days.

(21) Appl. No.: 16/174,238

(22) Filed: Oct. 29, 2018

(65) Prior Publication Data

US 2019/0130034 A1    May 2, 2019

(30) Foreign Application Priority Data

Oct. 31, 2017 (EP) ...................................... 7199428

(51) Int. Cl.
| | | |
|---|---|---|
| *G06F 16/00* | (2019.01) | |
| *G06F 16/61* | (2019.01) | |
| *G06F 3/16* | (2006.01) | |
| *G06F 16/28* | (2019.01) | |
| *G06F 16/60* | (2019.01) | |

(52) U.S. Cl.
CPC .............. *G06F 16/61* (2019.01); *G06F 3/165* (2013.01); *G06F 16/285* (2019.01); *G06F 16/60* (2019.01)

(58) Field of Classification Search
CPC ........ G06F 16/61; G06F 16/285; G06F 16/60; G06F 3/165
See application file for complete search history.

(56) References Cited

FOREIGN PATENT DOCUMENTS

WO    WO02/11123 A2    2/2002

OTHER PUBLICATIONS

Chahid Ouali et al., "Fast Audio Fingerprinting System Using GPU and a Clustering-Based Technique," IEEE/ACM Transactions on Audio, Speech, and Language Processing, vol. 24, No. 6, Jun. 1, 2016 (Jun. 1, 2016), pp. 1106-1118, XP055439240, USA, ISSN: 2329-9290, DOI: 10.1109/TASLP.2016.2541303, 13 pgs.
Pedro Cano et al., "A Review of Audio Fingerprinting," The Journal of VLSI Signal Processing, Kluwer Academic Publishers, BO, vol. 41, No. 3, Nov. 1, 2005 (Nov. 1, 2005), pp. 271-284, XP019216680, ISSN: 1573-109X, DOI: 10.1007/s11265-005-4151-3, 14 pgs.
Spotify AB, Extended European Search Report, EP17199428.8, dated Jan. 19, 2018, 10 pgs.
Spotify AB, Communication Pursuant to Article 94(3), EP17199428.8, dated Jan. 20, 2020, 4 pgs.

*Primary Examiner* — Jared M Bibbee
(74) *Attorney, Agent, or Firm* — Morgan, Lewis & Bockius LLP (57) ABSTRACT

Methods and a computer-readable storage device for detecting shared audio content between first audio content information and second audio content information is provided. The methods cluster similar fingerprints to lessen the impact that similar or repetitive sounds have on the final decision, thereby producing a more accurate final decision about whether the first audio content information shares audio content with the second audio content information.

16 Claims, 8 Drawing Sheets

FINGERPRINT CLUSTERING FOR CONTENT-BASED AUDIO RECOGNITION

RELATED APPLICATIONS

This application claims priority to European Patent Application No. EP 17199428, filed Oct. 31, 2017, entitled, "FINGERPRINT CLUSTERING FOR CONTENT-BASED AUDIO RECOGNITION," which is hereby incorporated by reference in its entirety.

TECHNICAL FIELD

The present invention relates to the field of content-based audio recognition. More specifically, it relates to a method for clustering fingerprints, for enabling improved comparisons between a query piece of audio and one or more reference piece(s) of audio.

BACKGROUND

Content-based audio recognition is the process of identifying similarities between the audio content of audio files. Performing content-based audio recognition usually involves comparing the audio content of a given audio file, called the query audio file, to the audio content of one or more other audio files, called the reference audio file(s). In many commercial applications, the number of reference audio files is very large, possibly in the order of millions.

The need for accurate, fast, and scalable content-based audio recognition is readily apparent in a wide range of practical situations. For example, the owner of a large musical catalogue may wish to determine whether a newly delivered song exists within that catalogue, even if the musical catalogue contains many millions of entries, and even if the arriving song has no associated metadata besides the audio signal.

Many different content-based audio identification methods are well-known in the prior art. Generally speaking, such methods consist of four phases. In a reference fingerprint ingestion phase, one or more fingerprints, called reference fingerprints, are extracted from the audio content information in each of the reference audio files, and stored into a database, called the reference database. In a query fingerprint extraction phase, one or more fingerprints, called query fingerprints, are extracted from the audio content information in the query audio file. In a fingerprint matching phase, the query fingerprints are compared to the reference fingerprints in the reference database, to assess their similarity. In a decision-making phase, a set of decision-making rules are applied to assess whether audio content of the query audio file is similar (or identical) to audio content of one or more of the reference audio files.

A given content-based audio recognition method's performance depends heavily on the methods it uses in each of these phases. The methods used in these phases vary considerably across content-based audio recognition methods in the prior art. Some content-based audio recognition techniques may implement these four phases in a different order to the one presented here, some content-based audio recognition techniques may implement additional phases, and some content-based audio recognition techniques may implement several phases in parallel. Nevertheless, these phases form the core of content-based audio recognition.

Whereas the format and information content of fingerprints may vary between applications, all content-based audio recognition methods share an important similarity. By their very nature, the fingerprints that content-based audio identification methods extract have a functional link to the sounds or events (such as rhythmic or melodic structure or timbre) in the corresponding audio files. In prior-art content-based audio identification methods, these fingerprints are typically extracted using pre-specified recipes. For example, a method for extracting fingerprints is disclosed in U.S. Pat. No. 8,586,847, by Ellis et al. Here, a music sample is filtered into a plurality of frequency bands, and inter-onset intervals are detected within each of these bands. Codes are generated by associating frequency bands and inter-onset intervals. For a given sample, all generated codes, along with the time stamps indicating when the associated onset occurred within the music sample, are combined to form a fingerprint.

This functional link between fingerprints and sounds or events creates several important problems when implementing existing content-based audio recognition methods in practice. For example, in audio files with repetitive audio content, such as recorded music, audio repetitions can cause a single query fingerprint to be similar to a large number of reference fingerprints, or vice-versa. This can cause content-based audio recognition methods to reach an erroneous conclusion that a query audio file and a reference audio file are similar, even in cases where these audio files share no audio content information except the repetitive audio content. Hence, an improved way of making a more accurate decision regarding such possible similarities would be advantageous.

Therefore, in addition to a reference fingerprint ingestion phase, a query fingerprint extraction phase, a fingerprint matching phase and a decision-making phase, the present inventors have realized that it is also very important to implement another phase, called a fingerprint clustering phase, to cluster fingerprints into groups of similar fingerprints.

SUMMARY

An object of the invention is to overcome or at least alleviate the problems associated with prior art.

According to a first aspect a method for detecting shared audio content between first audio content information being associated with a first set of fingerprints and second audio content information being associated with a second set of fingerprints is provided. The method comprises calculating a first matching score between a fingerprint of the first set and a fingerprint of the second set using a first matching algorithm, wherein the fingerprint of the first set and the fingerprint of the second set forms a first pair. The method further comprises calculating a second matching score for at least one second pair of fingerprints in the first set of fingerprints. Moreover, the method comprises clustering fingerprints associated with at least one second matching score that satisfies a cluster threshold into a clustered group, such that each clustered group comprises at least two fingerprints associated with a second pair having a second matching score satisfying the cluster threshold. Furthermore, the method comprises making a positive decision that the first audio content information shares audio content with the second audio content information at least based on information associated with the first pair(s) and the clustered groups(s).

According to a second aspect a non-transitory computer readable storage medium having instructions stored thereon that, when executed by a computing device, cause the computing device to perform the method of the first aspect is provided.

According to a third aspect a method for detecting shared audio content between a first audio content information being associated with a first set of fingerprints and a second audio content information being associated with a second set of fingerprints is provided. The method comprises calculating a first matching score between a fingerprint of the first set and a fingerprint of the second set using a first matching algorithm, wherein the fingerprint of the first set and the fingerprint of the second set forms a first pair. The method further comprises clustering fingerprints of the first set and second set into at least one clustered group, wherein each clustered group comprises at least one first pair of fingerprints having an associated first matching score satisfying a cluster threshold, and wherein each further first pair of fingerprints of each clustered group have one fingerprint in common with at least one other first pair of said clustered group. Moreover, the method comprises making a positive decision that the first audio content information shares audio content with the second audio content information at least based on information associated with the first pair(s) and the clustered groups(s).

According to a fourth aspect a non-transitory computer readable storage medium having instructions stored thereon that, when executed by a computing device, cause the computing device to perform the method of the third aspect.

Also disclosed are examples according to the following numbered clauses:

(A1) In some embodiments, a method for detecting shared audio content between first audio content information being associated with a first set of fingerprints and second audio content information being associated with a second set of fingerprints comprises: calculating a first matching score between a fingerprint of the first set and a fingerprint of the second set using a first matching algorithm, wherein the fingerprint of the first set and the fingerprint of the second set forms a first pair, calculating a second matching score for at least one second pair of fingerprints in the first set of fingerprints, clustering fingerprints associated with at least one second matching score that satisfies a cluster threshold into a clustered group, such that each clustered group comprises at least two fingerprints associated with a second pair having a second matching score satisfying the cluster threshold, and making a positive decision that the first audio content information shares audio content with the second audio content information at least based on information associated with the first pair(s) and the clustered groups(s).

(A2) In some embodiments of the method as defined in clause (A1), the second matching score is calculated using a second matching algorithm.

(A3) In some embodiments of the method as defined in any preceding clause (A1)-(A2), at least one optionally remaining fingerprint that is not part of a clustered group is grouped into a non-clustered group, such that the at least one non-clustered group comprises a single fingerprint having no associated second matching scores satisfying the cluster threshold, and making the positive decision is further based on information associated with the non-clustered group(s).

(A4) In some embodiments of the method as defined in clause (A3), a group matching score is derived for at least one clustered or non-clustered group based on the first matching scores associated with the fingerprint(s) of each clustered or non-clustered group that satisfies a first threshold, and making the positive decision is further based on said group matching score.

(A5) In some embodiments of the method as defined in clause (A3), making a positive decision is executed by: deriving a confidence score based on the fingerprints of the at least one clustered group or non-clustered group and at least one fingerprint of the second set, and making the positive decision provided that said confidence score satisfies a confidence threshold.

(A6) In some embodiments of the method as defined in any preceding clause (A1)-(A5), at least one further second pair of fingerprints of each clustered group have one fingerprint in common with at least one other second pair of said clustered group.

(A7) In some embodiments of the method as defined in any preceding clause (A1)-(A6), each clustered group comprises only fingerprints having an associated first matching score satisfying the first threshold.

(A8) In some embodiments of the method as defined in clause (A3), wherein each non-clustered group comprises only fingerprints having an associated first matching score satisfying the first threshold.

(A9) In some embodiments of the method as defined in any preceding clause (A1)-(A8), the first audio content information relates to a query audio file, and wherein the second audio content relates to a single reference audio file, or vice versa.

(A10) In some embodiments of the method as defined in any preceding clause (A1)-(A9) each fingerprint contains a one dimensional bit stream.

(A11) In some embodiments of the method as defined in any preceding clause (A1)-(A10), the first matching algorithm or the second matching algorithm is related to a K-means calculation, hierarchical clustering, or pairwise distance in a metric space of the associated fingerprints.

(A12) In some embodiments of the method as defined in any preceding clause (A1)-(A11), the first matching algorithm is arranged to give a higher first matching score if the associated fingerprint of the first set and fingerprint of the second set are associated with the same frequency band.

(A13) In some embodiments of the method as defined in any preceding clause (A1)-(A12), the cluster threshold is based on: a maximum distance between the two compared fingerprints of the first set; or a threshold distance from a common point in the fingerprint space.

(A14) In some embodiments of the method as defined in clause (A4), at least one clustered or non-clustered group matching score is derived by either: selecting the first matching score having the largest value of each group; averaging the first matching scores of each group; or aggregating the first matching scores of each group.

(A15) In some embodiments of the method as defined in clause (A5) combined with clause (A4), the confidence score is derived by aggregating the derived clustered or non-clustered group matching scores using a summary statistics function.

(A16) In some embodiments of the method as defined in any preceding clause (A1)-(A15), each fingerprint is generated from a frequency representation of a part of the associated audio content information.

(A17) In some embodiments of the method as defined in clause (A14), the aggregating comprises executing a summary statistics function on the first matching scores of each clustered or non-clustered group.

(A18) In some embodiments of the method as defined in clause (A4), the group matching score is further based on frequency information of the associated fingerprints of at least one of the clustered or non-clustered groups.

(A19) In some embodiments, a non-transitory computer readable storage medium has instructions stored thereon that, when executed by a computing device, cause the computing device to perform the method according to any one of clauses (A1) to (A18).

(A20) In some embodiments, a method for detecting shared audio content between a first audio content information being associated with a first set of fingerprints and a second audio content information being associated with a second set of fingerprints comprises: calculating a first matching score between a fingerprint of the first set and a fingerprint of the second set using a first matching algorithm, wherein the fingerprint of the first set and the fingerprint of the second set forms a first pair; clustering fingerprints of the first set and second set into at least one clustered group, wherein each clustered group comprises at least one first pair of fingerprints having an associated first matching score satisfying a cluster threshold, and wherein each further first pair of fingerprints of each clustered group have one fingerprint in common with at least one other first pair of said clustered group; and making a positive decision that the first audio content information shares audio content with the second audio content information at least based on information associated with the first pair(s) and the clustered groups(s).

(A21) In some embodiments of the method as defined in clause (A20), at least one optionally remaining fingerprint that is not part of a clustered group is grouped into a non-clustered group, such that the at least one non-clustered group comprises a single fingerprint having no associated second matching scores satisfying the cluster threshold; and making the positive decision is further based on information associated with the non-clustered group(s).

(A22) In some embodiments of the method as defined in clause (A20) or (A21), a group matching score for each clustered or non-clustered group is derived based on the first matching scores associated with the fingerprint(s) of each clustered or non-clustered group; and making the positive decision is further based on the group matching scores.

(A23) In some embodiments of the method as defined in any one of clauses (A20) to (A22), the first audio content information relates to a query audio file, and the second audio content relates to a reference audio file, or vice versa.

(A24) In some embodiments of the method as defined in any one of clauses (A20) to (A23) each fingerprint contains a one dimensional bit stream.

(A25) In some embodiments of the method as defined in any one of clauses (A20) to (A24), the first matching algorithm is related to a K-means calculation, hierarchical clustering, pairwise distance in metric space of the associated fingerprints.

(A26) In some embodiments of the method as defined in any one of clauses (A20) to (A25), the first matching algorithm is arranged to give a higher first matching score if the associated fingerprint of the first set and fingerprint of the second set are associated with the same frequency band.

(A27) In some embodiments of the method as defined in any one of clauses (A20) to (A26), the cluster threshold is a maximum hamming distance between the two compared fingerprints of the first set and second set.

(A28) In some embodiments of the method as defined in clause (A22), at least one group matching score is derived by either: selecting the first matching score having the largest value of each group; averaging the first matching scores of each group; or aggregating the first matching scores of each group.

(A29) In some embodiments of the method as defined in clause (A21), a confidence score is derived based on the fingerprints of the at least one clustered group or non-clustered group and at least one fingerprint of the second set, and the positive decision is made provided that said confidence score satisfies a confidence threshold.

(A30) In some embodiments of the method as defined in any one of clauses (A20) to (A29), each fingerprint is generated from a frequency representation of a part of the associated audio content information.

(A31) In some embodiments of the method as defined in clause (A28), the aggregating comprises executing a summary statistics function on the derived first matching scores of each group.

(A32) In some embodiments of the method as defined in clause (A22), the group matching score is further based on frequency information of the associated fingerprints of each clustered or non-clustered group.

(A33) In some embodiments, a non-transitory computer readable storage medium has instructions stored thereon that, when executed by a computing device, cause the computing device to perform the method according to clause (A20).

Other objectives, features and advantages of the present invention will appear from the following detailed disclosure, from the attached claims, as well as from the drawings. It is noted that the invention relates to all possible combinations of features.

BRIEF DESCRIPTION OF THE DRAWINGS

By way of example, embodiments of the present invention will now be described with reference to the accompanying drawings, in which.

DETAILED DESCRIPTION

The present invention will now be described in more detail.

As described above, conventional methods for content-based audio recognition rely on comparing the fingerprints extracted from query and reference audio files. However, these methods typically perform very poorly when several of the query fingerprints are similar. For example, in the presence of many similar query fingerprints, such methods may reach an erroneous conclusion that a query audio file and a reference audio file are similar, even in cases where these audio files share no other audio content information. It should be appreciated that several query fingerprints may relate to such similar sounds, and that without any filtration, they may contribute too heavily in the decision-making phase. Hence, using the conventional techniques there is an imminent risk that repetitive sounds could be represented by so many fingerprints that their overall impact on the positive matching process drowns out the other fingerprints in comparison.

Hence, for songs such as those with repetitive elements, the other fingerprints will have less chance of making an impact on the positive matching process unless the fingerprints corresponding to the repetitive sounds are clustered. For example, if several fingerprints associated to the repetitions match to one or more fingerprints from a reference audio track (also referred to as a reference audio file), this reference audio track may be given a "high" (i.e. suggesting similar/identical audio content information) confidence score regardless of whether other genuinely different matches are found, leading to a possible false positive identification.

To this end, the present invention improves computer technology and is directed to an improvement in the functioning of a computer, since using the method of invention it is now possible to more accurately identify shared audio content between two audio files. Using the method of the present invention thus enables computers to produce accurate detection of shared audio content, which previously only could be produced by human specialists. However, the method of the present invention approaches the detection of shared audio content in a much different way than a human would be able to do. Hence, to this end the present method provides a non-conventional and non-generic way to identify audio content being shared between a query audio file and a reference audio file.

Accordingly, an aim of the present invention is to provide an improved method of detecting shared audio content between a query audio file and a reference audio file based on the fingerprints extracted from each of these files.

Figure 1:
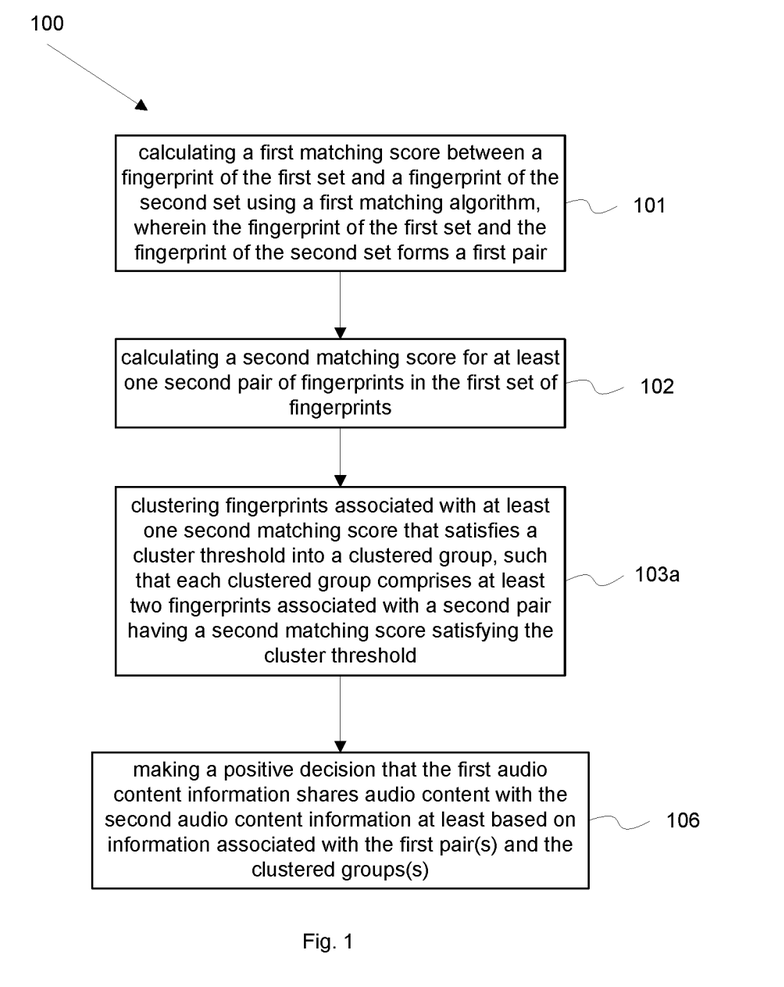
FIG. 1 is a flow chart of a method for detecting shared audio content between a first set of reference fingerprint, e.g. pertaining to a query audio sample, and a second set of fingerprints, e.g. pertaining to a reference audio file.

FIG. 1 is a flow chart illustrating a method 100 for detecting shared audio content between a first audio content information being associated with a first set of fingerprints and a second audio content information being associated with a second set of fingerprints. The first audio content information may relate to a query audio track/sample, and the second audio content information may relate to a single reference audio track/sample. As indicated above, the method(s) of the present invention may be utilized using fingerprints extracted using conventional methods. Alternatively, the fingerprints utilized may be those disclosed in the included cross-related application with title "Audio fingerprint extraction and audio recognition using said fingerprints" filed by the present Applicant at the same date as this patent application. Such fingerprints are extracted using a trained neural network from areas of a time-frequency representation of the audio content information of a query audio file or reference audio file. To this end, each fingerprint may be generated from a frequency representation of a part of the associated audio content information. More precisely, the each fingerprint may be generated by applying a trained neural network on each area of data points.

The method comprises calculating 101 a first matching score a fingerprint of the first set and a fingerprint of the second set using a first matching algorithm, wherein the fingerprint of the first set and the fingerprint of the second set forms a first pair. The first matching score may be a first distance; the smaller the distance, the more similar the first pair of fingerprints. The method further comprises calculating 102 a second matching score, e.g. a second distance, between at least one second pair of fingerprints in the first set of fingerprints. The second matching score may be calculated using a second matching algorithm. Moreover, the method comprises clustering 103a fingerprints associated with at least one second matching score that satisfies a cluster threshold into at least one clustered group It should be appreciated that each group may comprise only fingerprints having an associated first matching score satisfying a first threshold.

At least one of the clustered groups comprises at least one second pair of fingerprints having an associated second matching score satisfying a cluster threshold. Hence, provided that the second matching score satisfies the cluster threshold, e.g. by the second distance being below the cluster threshold, the associated fingerprints are included into one of said groups.

The method further comprises making 106 a positive decision that the first audio content information shares audio content with the second audio content information at least based on information associated with the first pair(s) and the clustered groups(s).

Since the decision is made based on information associated with the clustered groups, the conventional negative impact of repetitive sounds occurring amongst the audio content information associated with the first set of fingerprints may be minimized.

It should be appreciated that each group may comprise a further second pair of fingerprints, where said further second pair of fingerprints have one fingerprint in common with at least one other second pair of said group.

Fingerprints

In content-based audio recognition, a fingerprint is a concise digital representation of the sounds or events (such as rhythmic or melodic structure or timbre) in the audio content of the query or reference audio file. Such fingerprints may be used as input to the present invention.

Each fingerprint may be a binary string, e.g. a 32 bit code, or a vector whose entries take any continuous value. As an example, a 5-minute long piece of music may generate approximately 5000 fingerprints, e.g. represented by 5000 32-bit binary strings.

The reference fingerprints, e.g. those pertaining to the second set of fingerprints, are extracted from the audio content information in each of the reference audio files, and may be stored into a database, also being referred to as a reference database. Let $F_r$ denote the set of fingerprints extracted from the reference audio file. Let D denote the database of all reference fingerprints extracted from all reference audio files.

Similarly, the query fingerprints may be extracted from the audio content information in the query audio file. Let $F_q$ denote the set of fingerprints extracted from a query audio file.

First Matching Score

The first matching score, in this case defined as a first distance d, may be calculated between each generated query fingerprint and each of the reference fingerprints available, using a suitable distance metric. More precisely, for a given query fingerprint $f_q$ in $F_q$ and a given reference fingerprint $f_r$ in $F_r$, let $d(f_q, f_r)$ denote the first distance between $f_q$ and $f_r$, measured using some specified distance metric. For example, if $f_q$ and $f_r$ are real-valued vectors, then $d(f_q, f_r)$ may be the Euclidean distance between $f_q$ and $f_r$. As another example, if $f_q$ and $f_r$ are binary strings, then $d(f_q, f_r)$ may be the Hamming distance between $f_q$ and $f_r$. In one example, each query fingerprint is compared to each reference fingerprint, or to a subset of reference fingerprints, to ascertain which query-reference pairs are within a given first threshold C of each other. In another example, when fingerprints take values in a discrete space, only the neighbouring fingerprints that are within a given first threshold C of $f_q$ may be queried to the database of reference fingerprints, and the database may then be asked to return exact matches for each of these neighbouring fingerprints. This is possible since the number of possible fingerprints within a threshold C of $f_q$ is finite when $f_q$ takes value in a discrete space. The distance $d(f_q,f_r)$ for a reference fingerprints that matches a neighbouring fingerprint then corresponds to the distance between $f_q$ and the given neighbouring fingerprint.

Given a query fingerprint $f_q$ and a reference fingerprint $f_r$ such that $d(f_q,f_r) \leq C$, the fingerprints $f_q$ and $f_r$ are called matching fingerprints. Similarly, given a query fingerprint $f_q$ and a reference fingerprint $f_r$ such that $d(f_q,f_r) > C$, the fingerprints $f_q$ and $f_r$ are called non-matching fingerprints.

As an example, where the associated fingerprints are represented as binary strings, the calculation of a first matching score, being a distance, may comprise identifying a number of potential reference fingerprints satisfying a distance threshold to at least one query fingerprint. This identification may be executed without accessing the reference fingerprints being stored in a database. Then, the database containing reference fingerprints are searched to collect any reference fingerprints being identical to the identified potential reference fingerprints. To this end, the following example is given.

Example 1

Assume that the query fingerprint is a binary string, with value 0000, and that the distance metric is the Hamming distance.

To find all reference fingerprints within a maximum Hamming distance of 0 from the query fingerprint (i.e. indicating an exact match), the method may comprise searching the database for the reference fingerprint(s) with value 0000 and returning the corresponding value.

To find all reference fingerprints within a maximum Hamming distance 1 from the query fingerprint, the method may comprise searching the database for reference fingerprints with values 0000, 0001, 0010, 0100, 1000. The value 0000 has Hamming distance 0 from the query fingerprint. The values 0001, 0010, 0100, and 1000 are the only possible values that have a Hamming distance of 1 from the query fingerprint. Hence, these five possible reference fingerprint values may be identified before accessing the database, and used as input to quickly obtain any corresponding fingerprints of the database.

Hence, the step of calculating 101 may thus comprise listing all possible values of reference fingerprints that satisfy the distance threshold, then searching the database for each of these possible values.

Non-Clustered Groups

Figure 2:
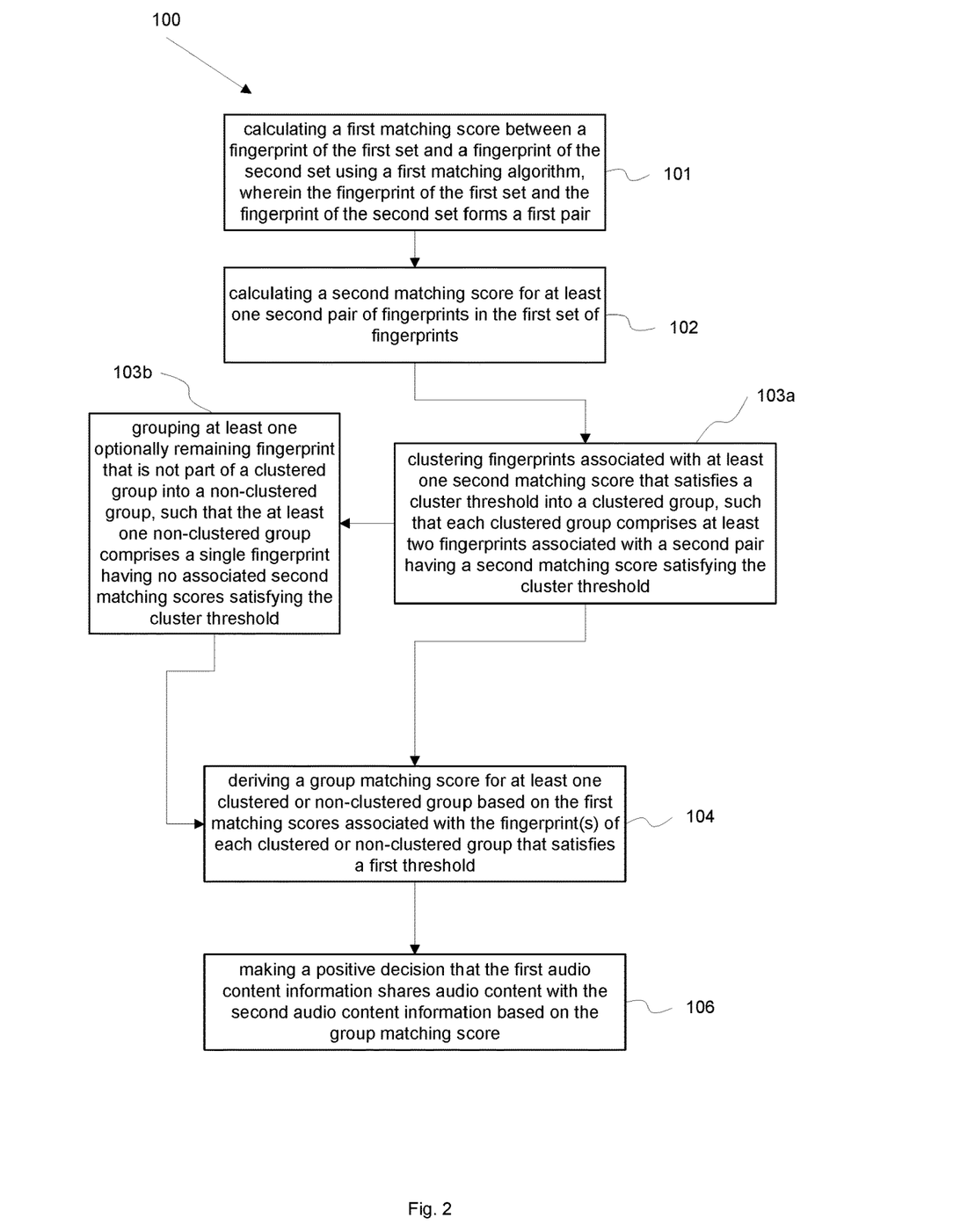
FIG. 2 is a flow chart of an extended version of the method of FIG. 1.
Figure 3:
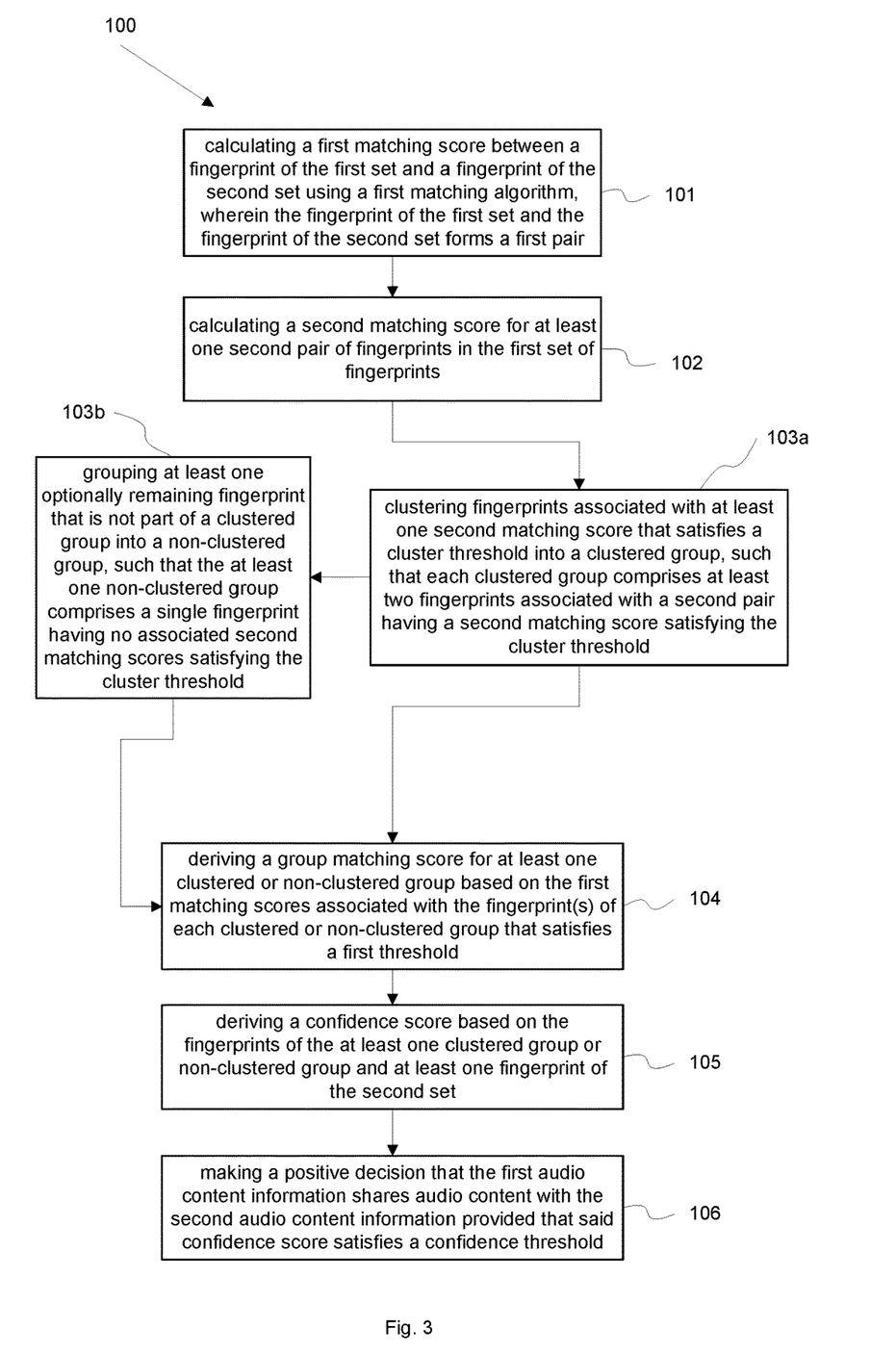
FIG. 3 is a flow chart of an extended version of the method of FIG. 1.

With reference to FIGS. 2 and 3, the method may further comprise grouping 103b at least one optionally remaining fingerprint that is not part of a clustered group into a non-clustered group, such that the at least one non-clustered group comprises a single fingerprint having no associated second matching scores satisfying the cluster threshold. In this example making 106 the positive decision is further based on information associated with the non-clustered group(s).

In this manner, non-clustered fingerprints, i.e. query fingerprints not forming part of a clustered group, may be defined to belong to a non-clustered group, wherein each non-clustered group comprises a single query fingerprint.

Decision Making Process

Instead of making a decision using pairs of matched fingerprints, as is conventionally done, the method(s) disclosed herein provides for making a decision based on the clustered groups of query fingerprints. The clustering acts to group similar query fingerprints together. More precisely, the clustering acts to filter similar, and likely repetitive, sounds, such that when reaching a final decision about possible similarity between the query audio file and a reference audio file, these similar sounds have less influence than if each of their constituent fingerprints were considered separately (which is the case in the conventional art).

For a given query fingerprint $f_q^1$ and another query fingerprint $f_q^2$, let $\hat{d}(f_q^1, f_q^2)$ denote a second matching score, in this case defined as a second distance between $f_q^1$ and $f_q^2$. For example, if the query fingerprints are real-valued vectors, then $\hat{d}(f_q^1, f_q^2)$ may be the Euclidean distance between $f_q^1$ and $f_q^2$. As another example, if the query fingerprints are binary strings, then $\hat{d}(f_q^1, q^2)$ may be the Hamming distance between $f_q^1$ and $f_q^2$.

The second distance may be used to determine if a query fingerprint belongs to a given clustered group. As an example, a set of query fingerprints may form a clustered group if the second distance between any pair of fingerprints in the group is below a given cluster threshold. If the fingerprint is in the form of a binary string, the cluster threshold may be based on a maximum Hamming distance between the two compared fingerprints of the first set. To further explain the underlying idea of this maximum Hamming distance threshold, the following non-limiting example is given.

Example 2

Consider a set of four query fingerprints $\{f_q^1, f_q^2, f_q^3, f_1^4\}$, such that:

$$f_q^1 = (0,0,0,0);$$

$$f_q^2 = (1,0,0,0);$$

$$f_q^3 = (0,1,1,1);$$

$$f_q^4 = (0,0,1,1).$$

Observe that, when using the Hamming distance as the second distance, it holds that:

$$\hat{d}(f_q^1, f_q^2) = 1;$$

$$\hat{d}(f_q^1, f_q^3) = 3;$$

$$\hat{d}(f_q^1, f_q^4) = 2;$$

$$\hat{d}(f_q^2, f_q^3) = 4;$$

$$\hat{d}(f_q^2, f_q^4) = 3;$$

$$\hat{d}(f_q^3, f_q^4) = 1;$$

If the cluster threshold is set to 1, then $\{f_q^1, f_q^2\}$ form a first cluster group and $\{f_q^3, f_q^4\}$ form a second cluster group.

Alternatively or additionally, the cluster threshold could be based on a threshold distance from a common point in the fingerprint space. Here, the underlying idea is to have all fingerprints in a given cluster at a distance smaller than a threshold from one given point in the space. To this end, consider the following non-limiting examples.

Example 3

Consider a set of four query fingerprints $\{f_q^1, f_q^2, f_q^3, f_q^4\}$, such that:

$f_q^1 = (0,0,0,0)$;

$f_q^2 = (1,0,0,0)$;

$f_q^3 = (1,1,0,0)$;

$f_q^4 = (0,0,1,1)$.

Observe that, when using the Hamming distance as the second distance, it holds that:

$\tilde{d}(f_q^1, f_q^2) = 1$;

$\tilde{d}(f_q^1, f_q^3) = 2$;

$\tilde{d}(f_q^1, f_q^4) = 2$;

$\tilde{d}(f_q^2, f_q^3) = 1$;

$\tilde{d}(f_q^2, f_q^4) = 3$;

$\tilde{d}(f_q^3, f_q^4) = 4$;

In this example, if the cluster threshold is set to 1, then $\{f_q^1, f_q^2\}$ form a first cluster group and $\{f_q^2, f_q^3\}$ form a second cluster group. Comparing $f_q^1$ to $f_q^3$ directly would suggest that these two fingerprints do not reside in the same cluster group. However, in some embodiments of the present invention, $f_q^2$ may be regarded as the centre of a cluster, and form the given point in the space from which the cluster threshold is set. Hence, in this case, if the cluster threshold is set to a maximum Hamming distance of 1 from $f_q^2$, then both $f_q^1$ and $f_q^3$ satisfy this requirement, so $\{f_q^1, f_q^2, f_q^3\}$ may form a single cluster group.

Example 4

In this example, each fingerprint takes a single real-number value. Consider a set of five query fingerprints $\{f_q^1, f_q^2, f_q^3, f_q^4, f_q^5\}$, such that:

$f_q^1 = 3.0$;

$f_q^2 = 3.1$;

$f_q^3 = 3.4$;

$f_q^4 = 1.0$;

$f_q^5 = 1.3$.

Observe that when using the Euclidean distance as the distance metric, and setting a cluster threshold of 0.2, it holds that $f_q^1$ and $f_q^2$ will reside within the same cluster group. However, it also holds that all of $f_q^1$, $f_q^2$, and $f_q^3$ reside within a distance of 0.2 from the point 3.2. Similarly, both $f_q^4$ and $f_q^5$ reside within a distance of 0.2 from any point in the closed interval [1.1, 1.2].

The fingerprints $\{f_q^1, f_q^2, f_q^3\}$ could form a first cluster group and the fingerprints $\{f_q^4, f_q^5\}$ may form a cluster group. Hence, the common point in the fingerprint space from which the other query fingerprints have a second distance below the cluster threshold does not necessarily need to be the value of a fingerprint or an average of the associated fingerprints.

The decision making process is in general made based on a comparison between the clustered and/or non-clustered groups of query fingerprints and the reference fingerprints.

With reference to FIGS. 2 and 3, the method may further comprise deriving 104 a group matching score, e.g. a group distance $\tilde{d}$, for at least one clustered or non-clustered group based on the first matching scores associated with the fingerprint(s) of each clustered or non-clustered group that satisfies a first threshold. In this way, each clustered group may be assigned a single group matching score or group distance, although each clustered group may contain several fingerprints. The positive decision may thus be made based further on the group matching score(s) of the clustered and non-clustered groups.

The group distance $\tilde{d}$, may be defined as a distance between a group of clustered, i.e. similar, query fingerprints and one or more reference fingerprint. When calculating a group distance, only the fingerprints whose first distance satisfies the given first threshold and whose second distance satisfies the given cluster threshold (meaning that the associated fingerprints form part of a clustered group) are considered. Since each first distance is calculated between a single query fingerprint and a single reference fingerprint, this means that only the reference fingerprints being most similar to the query fingerprints of each clustered group are included when calculating the group matching score.

There are several possible ways to formulate the group distance. Consider a group $F_g = \{f_g^1, f_g^2, \ldots f_g^k\}$ of k query fingerprints that satisfy the criteria to be regarded as a cluster, and a given reference fingerprint $f_r$. As one example, the group distance $\tilde{d}(F_g, f_r)$, may be the minimum among the distances between the similar query fingerprints and the reference fingerprint, $\tilde{d}(F_g, f_r) = \min\{d(f_q, f_r) | f_q \in F_g\}$.

As another example, the group distance $\tilde{d}(F_g, f_r)$ may be the mean distance between the similar query fingerprints and the reference fingerprint, $$\tilde{d}(F_g, f_r) = \left(\frac{1}{k}\right) \sum_{f_q \in F_g} d(f_q, f_r).$$

Other examples of the group distance may include any additive or multiplicative combination of the first matching scores, or logarithmic transforms thereof, such as:

$\tilde{d}(F_g, f_r) = d(f_g^1, f_r) d(f_g^2, f_r) \ldots d(f_g^k, f_r)$;

$\tilde{d}(F_g, f_r) = \log(d(f_g^1, f_r)) + \log(d(f_g^2, f_r)) + \ldots + \log(d(f_g^k, f_r))$;

$\tilde{d}(F_g, f_r) = 1/(1 + 1/(d(f_g^1, f_r) + d(f_g^2, f_r) + \ldots + d(f_g^k, f_r)))$.

The above examples should be seen as non-limiting examples since there are many more possibilities at hand.

With reference to FIG. 2 the making 106 the positive decision may be based on the group matching score/group distance.

With reference to FIG. 3, as part of the decision making 106 process, the method may further comprise deriving 105 a confidence score, which confidence score in turn allows for making a decision whether audio content of the query audio file is similar (or identical) to audio content of one or more of the reference audio files. The confidence score may be derived by applying a set of decision-making rules.

The confidence score may be a binary score, taking only values 0 or 1, or may be a continuous score taking any continuous value in a bounded or unbounded interval. For example, the confidence score may count the fraction of fingerprint groups with a group distance below a given cluster threshold, and may therefore be a continuous variable taking values between 0 and 1 inclusive. As another non-limiting example, the confidence score may be 1 if there exist at least 5 fingerprint groups with a group distance below a given cluster threshold, or may be 0 otherwise. It should be appreciated that any number of groups could be set as criterion, and the present invention is not limited to any particular number in this regard. A content-based audio recognition system may conclude that audio content of the query audio file is similar (or identical) to audio content of a given reference file if the confidence score is above some given confidence threshold, e.g., 0.5.

The decision-making rules and/or the confidence score may consider some information about the group distance, as shown in FIG. 3. Alternatively, or additionally the decision-making rules and/or the confidence score may consider additional information about the query fingerprints, the reference fingerprints, or both. For example, the decision-making rules may take as input the frequencies or frequency ranges over which the groups of matched fingerprints occur in each of the query and reference files. In some embodiments, the decision-making rules may consider some information about the group distance and additional information about the query fingerprints, the reference fingerprints, or both. For example, a group of two matching pairs of fingerprints, both with Hamming distance 0 and similar associated frequencies, may be given a higher confidence score than a group of two matching pairs of fingerprints, both with Hamming distance 0 but with dissimilar associated frequencies.

Example 5

This example illustrates a case with four query fingerprints. Let N denote the number of reference audio files in the database. For each $j=1, \ldots, N$, let $f_{r_j}^1, \ldots f_{r_j}^{m_j}$ denote the set of fingerprints for reference audio file j (where $m_j$ denotes the number of fingerprints for reference audio file j). Let $f_q^1, \ldots, f_q^m$ denote the set of query fingerprints, where m denotes the number of fingerprints in the query audio file (in this example, m=4).

In a first stage, e.g. referring with step 101 of the method, a first matching score ($d(f_q^i, f_{r_j}^1), d(f_q^i, f_{r_j}^2), \ldots d(f_q^i, f_{r_j}^{m_j})$) is calculated between each query fingerprint and each of the reference fingerprints.

In the second stage, e.g. referring with step 102 of the method, a second matching score ($\hat{d}(f_q^1, f_q^2)$, etc) is calculated between each query fingerprint available.

Here, it should be noted that symmetric or reciprocal scores, e.g. $\hat{d}(f_q^1, f_q^2)$ and $\hat{d}(f_q^2, f_q^1)$, $\hat{d}(f_q^1, f_q^3)$ and $\hat{d}(f_q^3, f_q^1)$ will normally be identical. Hence, to this end it may be possible to calculate one second matching score for each second pair.

In the third stage, e.g. referring with step 103 of the method, the query fingerprints are clustered into groups by identifying the second distances that satisfy the cluster threshold. In this example, $\{f_q^1, f_q^2\}$ forms a first group and $\{f_q^3, f_q^4\}$ forms a second group.

In a fourth stage, e.g. referring with step 104 of the method, a group distance is derived for the first and second groups, by considering (for each group) only the first distances that satisfy a first threshold. In this example, the first distances $d(f_q^1, f_{r_1}^1), d(f_q^1, f_{r_1}^2), d(f_q^2, f_{r_1}^2),$ and $d(f_q^2, f_{r_1}^3)$, relating to the query fingerprints of the first group satisfy the first threshold, whereas the first matching scores $d(f_q^3, f_{r_1}^4)$, and $d(f_q^4, f_{r_1}^5)$, relating to the query fingerprints of the second group satisfy the first threshold. As mentioned previously, the group distance may be calculated in different ways. Let $S_1$ denote the group distance for the first group and let $S_2$ denote the group distance for the second group.

In a fifth stage, e.g. referring with step 105 of the method, a confidence score is derived for the reference audio, based on the first and second group distances, in the ways previously mentioned.

In a sixth stage, e.g. referring with step 106 of the method, a decision is made about whether the query audio file shares audio content with the reference audio file. If the confidence score satisfies a confidence threshold, then a positive match decision is made. The positive match decision may e.g. be further output to a user or stored in a list for subsequent retrieval for a user or external computing device.

It should be appreciated that method step 106 may include steps 104 and 105.

Audio Content Information

The audio content information may be an audio signal, such as the audio signal of a piece of music. The audio signal may be pre-processed by applying one or more pre-processing techniques. Examples of such pre-processing techniques may include the application of high-pass filters, low-pass filters, audio equalization, and many other techniques well-known to those skilled in the art. It should be appreciated that the audio signal may be any conventional audio signal, relating to any number of audio formats, containing audio information.

Alternative Method

An alternative method 200 will now be explained with reference to FIG. 4. Here, the clustering is conducted in a different way, whereby the step of calculating 102 a second matching score, e.g. a second distance, for each second pair of fingerprints in the first set of fingerprints using a second matching algorithm is no longer necessary.

Figure 4:
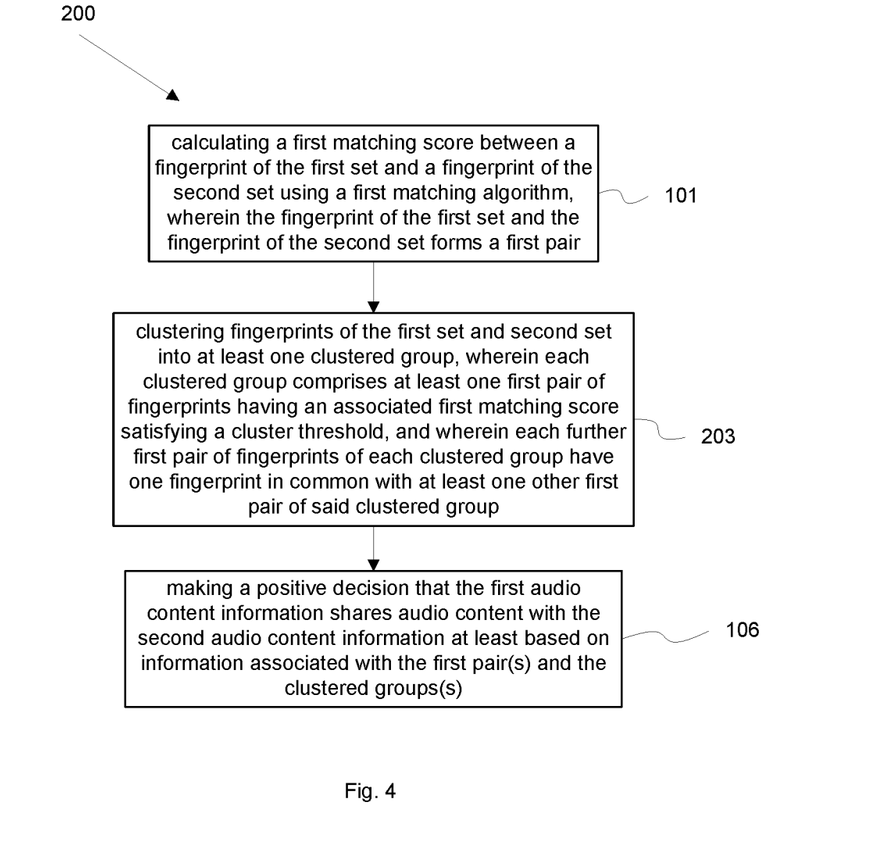
FIG. 4 is a flow chart of an alternative method for detecting shared audio content between a first set of reference fingerprints, e.g. pertaining to a query audio sample, and a second set of fingerprints, e.g. pertaining to a reference audio file.
Figure 5:
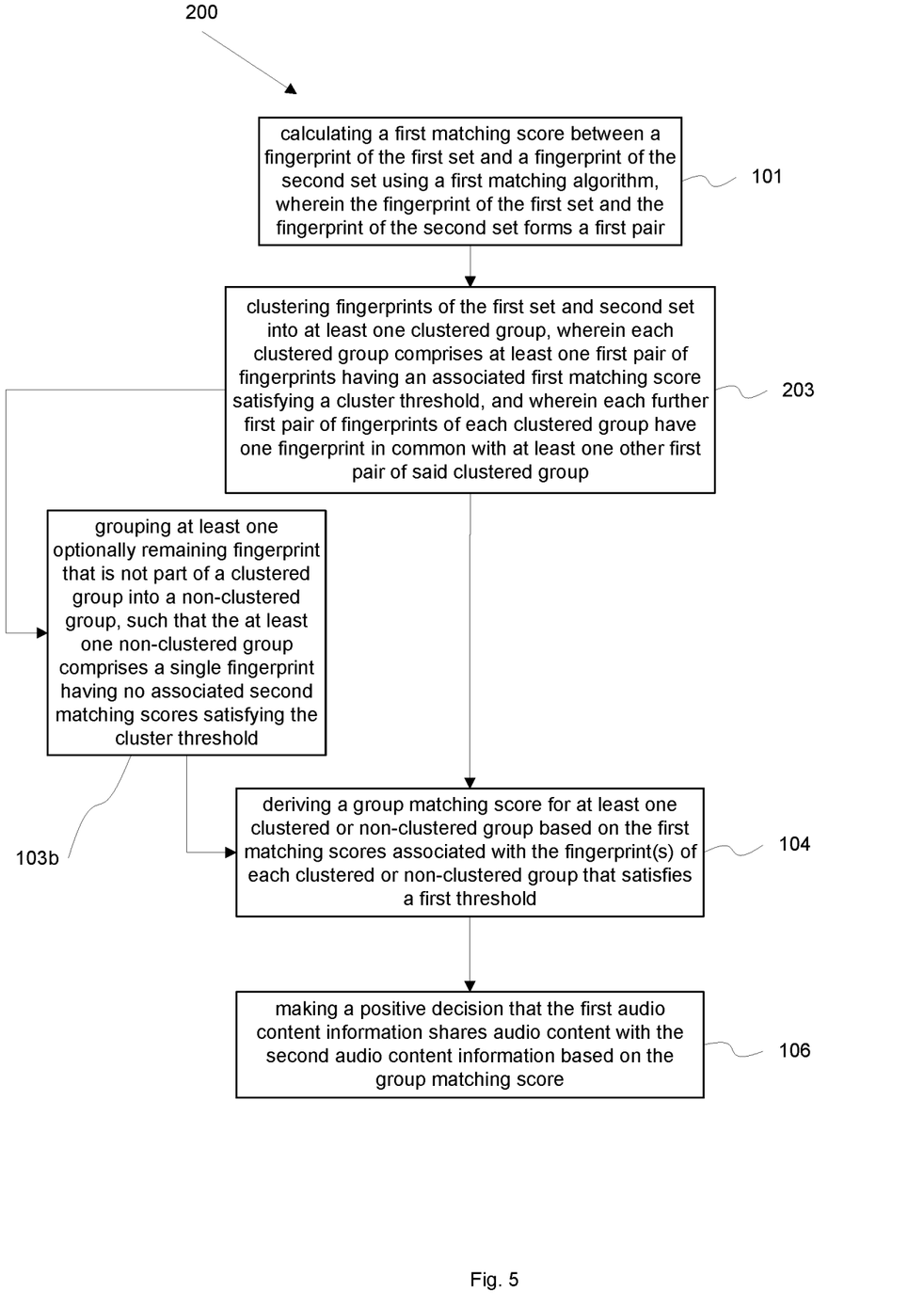
FIG. 5 is a flow chart of an extended version of the method of FIG. 4.

FIG. 5 shows an extended version of FIG. 4, wherein the steps 101, 103a, 103b, 104, and 106 are conducted in the same way as in the first method described with reference to FIG. 2 above.

Figure 6:
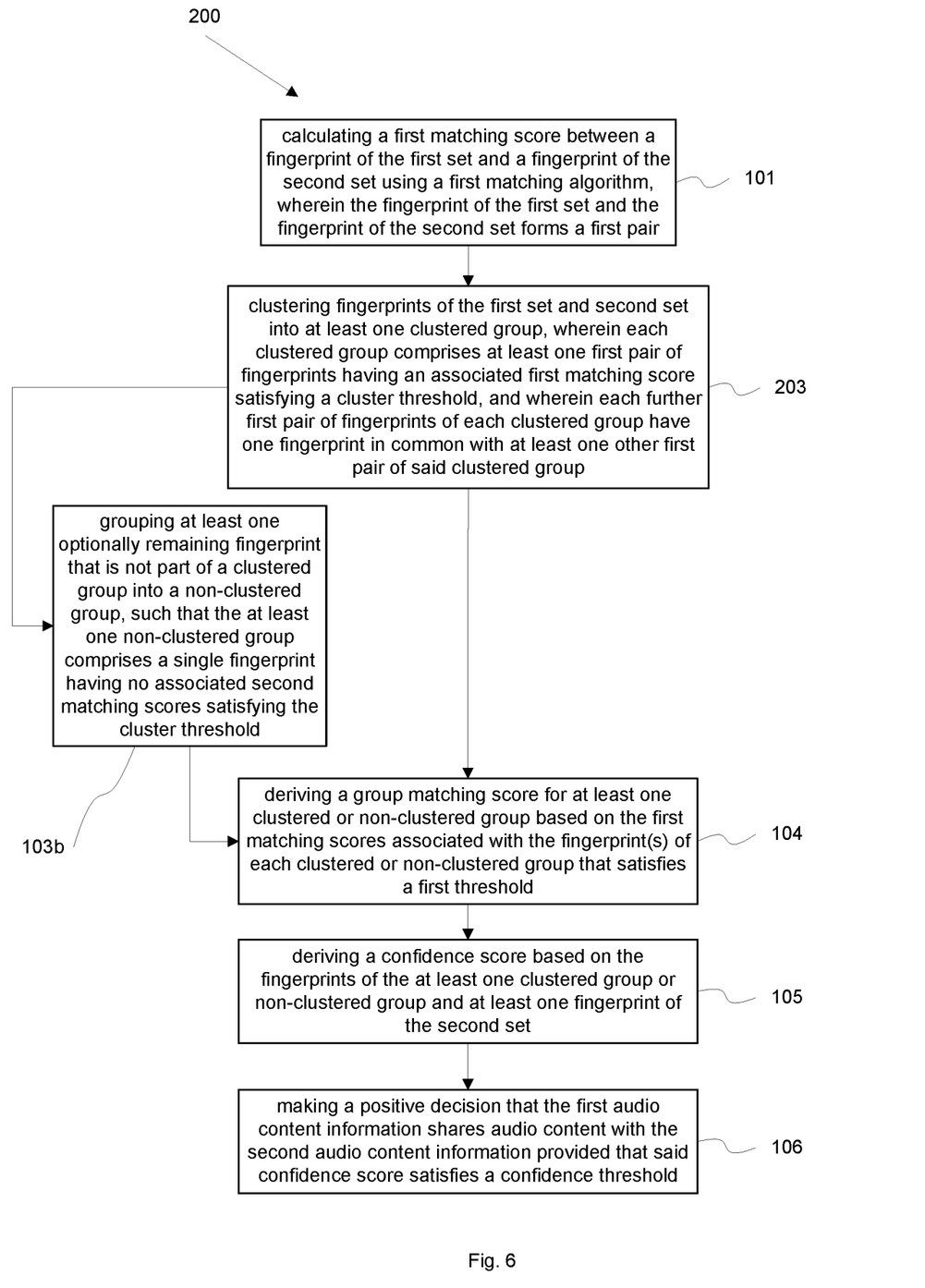
FIG. 6 is a flow chart of an extended version of the method of FIG. 4.

FIG. 6 shows an extended version of FIG. 4, wherein the steps 101, 103a, 103b, 104, 105, and 106 are conducted in the same way as in the first method described with reference to FIG. 3 above.

With reference to FIGS. 4 to 6, instead of clustering the fingerprints of the first set of fingerprints together, the clustering 203 is executed by clustering 203 fingerprints of the first set and second set into a number of groups, wherein each group comprises at least one first pair of fingerprints having an associated first matching score, e.g. first distance d, that satisfies a cluster threshold, and wherein each further first pair of fingerprints of each group have one fingerprint in common with at least one other first pair of said group.

In this way, the clustering is based purely on the first matching scores, e.g. first distances, and not on the second matching scores, e.g. second distances, as described above.

The following example attempts to further explain the modified clustering.

Example 6

In this example, we have four query fingerprints $f_q^1, f_q^2, f_q^3, f_q^4$, and five reference fingerprints $f_r^1, f_r^2, f_r^3, f_r^4, f_r^5$, each of which are binary strings. The first distance between two fingerprints is the Hamming distance. In this example, these distances are as follows:

$d(f_q^1, f_r^1) = 1;$ $d(f_q^1, f_r^2) = 1;$ $d(f_q^1, f_r^3) = 3;$ $d(f_q^1, f_r^4) = 4;$ $d(f_q^1, f_r^5) = 4;$ $d(f_q^2, f_r^1) = 1;$ $d(f_q^2, f_r^2) = 3;$ $d(f_q^2, f_r^3) = 1;$ $d(f_q^2, f_r^4) = 4;$ $d(f_q^2, f_r^5) = 2;$ $d(f_q^3, f_r^1) = 2;$ $d(f_q^3, f_r^2) = 4;$ $d(f_q^3, f_r^3) = 4;$ $d(f_q^3, f_r^4) = 1;$ $d(f_q^3, f_r^5) = 3;$ $d(f_q^4, f_r^1) = 4;$ $d(f_q^4, f_r^2) = 4;$ $d(f_q^4, f_r^3) = 2;$ $d(f_q^4, f_r^4) = 1;$ $d(f_q^4, f_r^5) = 1.$

The cluster threshold is set to a maximum Hamming distance of 1. The query-reference pairs that satisfy this cluster threshold are $\{f_q^1, f_r^1\}$, $\{f_q^1, f_r^2\}$, $\{f_q^2, f_r^1\}$, $\{f_q^2, f_r^3\}$, $\{f_q^3, f_r^4\}$, $\{f_q^4, f_r^4\}$, and $\{f_q^4, f_r^5\}$.

The fingerprints $f_r^1$ and $f_r^2$ are both within a Hamming distance of 1 from $f_q^1$, so these three fingerprints reside within the same cluster group. The fingerprint $f_q^2$ is within a Hamming distance of 1 from $f_r^1$, so this fingerprint also resides within the group. Similarly, the fingerprint $f_r^3$ is within a Hamming distance of 1 from the fingerprint $f_q^2$, so this fingerprint also resides within the group. Therefore, the first cluster group is $\{f_q^1, f_q^2, f_r^1, f_r^2, f_r^3\}$. Using the same logic, the second cluster group is $\{f_q^3, f_q^4, f_r^4, f_r^5\}$.

As mentioned above, once the groups have been identified, a group score may be derived for each group. A confidence score and a decision about whether or not the query audio file shares audio content with the reference audio file may then be determined.

The first matching algorithm or the second matching algorithm may utilize a K-means calculation, hierarchical clustering, or pairwise distance in metric space, such as the Euclidian distance or the Hamming distance, of the associated fingerprints.

The method(s) above may be executed by a computing device using instructions stored on a non-transitory computer readable storage medium when executed by a computing device, to cause the computing device to perform the method.

Figure 7:
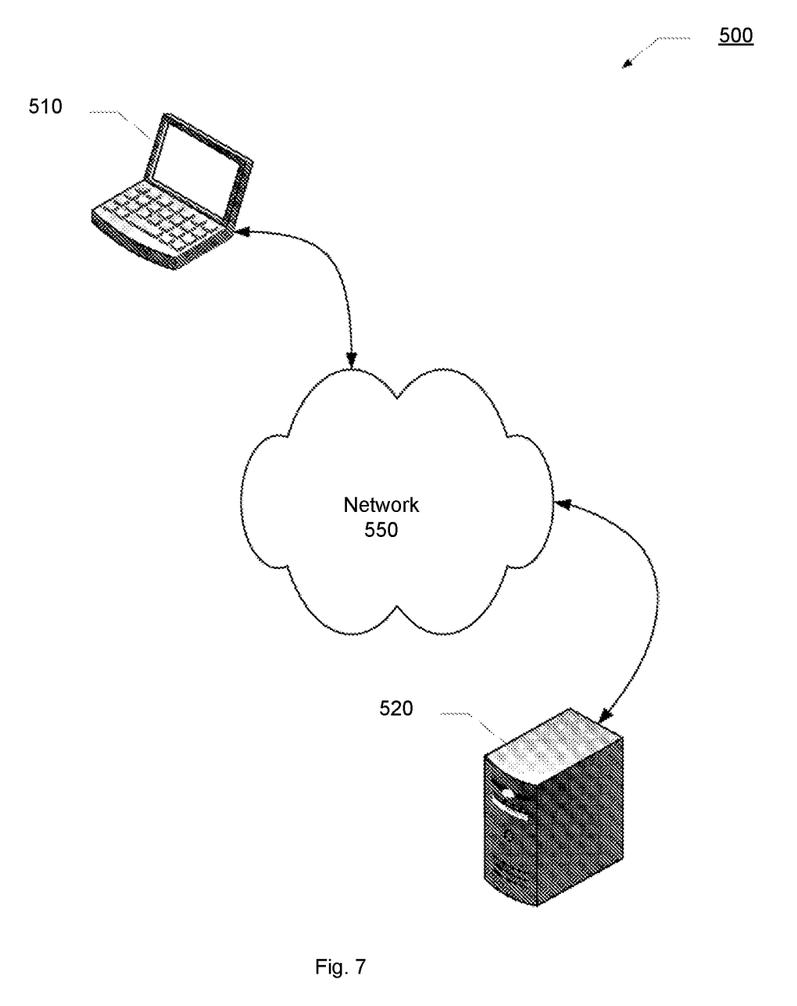
FIG. 7 is a block diagram of a system for detecting shared audio content according to the methods provided herein.

Referring now to FIG. 7, a system 500 for identifying similarities between a query audio file and a reference audio file may include a client computer 510, and a server 520 coupled via a network 550. The network 550 may be or include the Internet. Although FIG. 7 shows, for ease of explanation, a single client computer and a single server, it must be understood that a large plurality of client computers and be in communication with the server 520 concurrently, and that the server 520 may comprise a plurality of servers, a server cluster, or a virtual server within a cloud.

Although shown as a portable computer, the client computer 510 may be any computing device including, but not limited to, a desktop personal computer, a portable computer, a laptop computer, a computing tablet, a set top box, a video game system, a personal music player, a telephone, or a personal digital assistant. Each of the client computer 510 and the server 520 may be a computing device including at least one processor, memory, and a network interface. The server, in particular, may contain a plurality of processors. Each of the client computer 510 and the server 520 may include or be coupled to one or more storage devices. The client computer 510 may also include or be coupled to a display device and user input devices, such as a keyboard and mouse, as shown in FIG. 7.

Each of the client computer 510 and the server 520 may execute software instructions to perform the actions and methods described herein. The software instructions may be stored on a machine readable storage medium within a storage device. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media. Within this patent, the term "storage medium" refers to a physical object capable of storing data. The term "storage medium" does not encompass transitory media, such as propagating signals or waveforms.

Each of the client computer 510 and the server 520 may run an operating system, including, for example, variations of the Linux, Microsoft Windows, Symbian, and Apple Mac operating systems. To access the Internet, the client computer may run a browser such as Microsoft Explorer or Mozilla Firefox, and an e-mail program such as Microsoft Outlook or Lotus Notes. Each of the client computer 510 and the server 520 may run one or more application programs to perform the actions and methods described herein.

The client computer 510 may be used by a "requestor" to send a query to the server 520 via the network 550. The query may request the server to identify a query audio file. The client computer 510 may generate a fingerprint of the query audio file and provide the fingerprint to the server 520 via the network 550. In this case, the method 100 of FIGS. 1 to 3, and method 200 of FIGS. 4 to 6 may be performed by the client computer 510. Alternatively, the client computer may provide the query audio file to the server as a series of time-domain samples, in which case the method 100 of FIGS. 1 to 3 and the method 200 of FIGS. 4 to 6 may be performed by the server 520.

However, also parts of the method 100, including additional retrieval of the query fingerprints, could be executed on the client computer while the server 520 could provide reference fingerprints to the client computer 520 by accessing the database 300. It should be appreciated that server 520 may extract reference fingerprints for the reference audio tracks or audio content information accessible and/or stored on the database 300. Hence, previous to the calculating steps of the methods the server may have extracted reference audio fingerprints of at least one audio file to be used in the calculating 101 being executed on the client computer and/or server 520 or alternatively both simultaneously in order to speeding up the comparing process.

Figure 8:
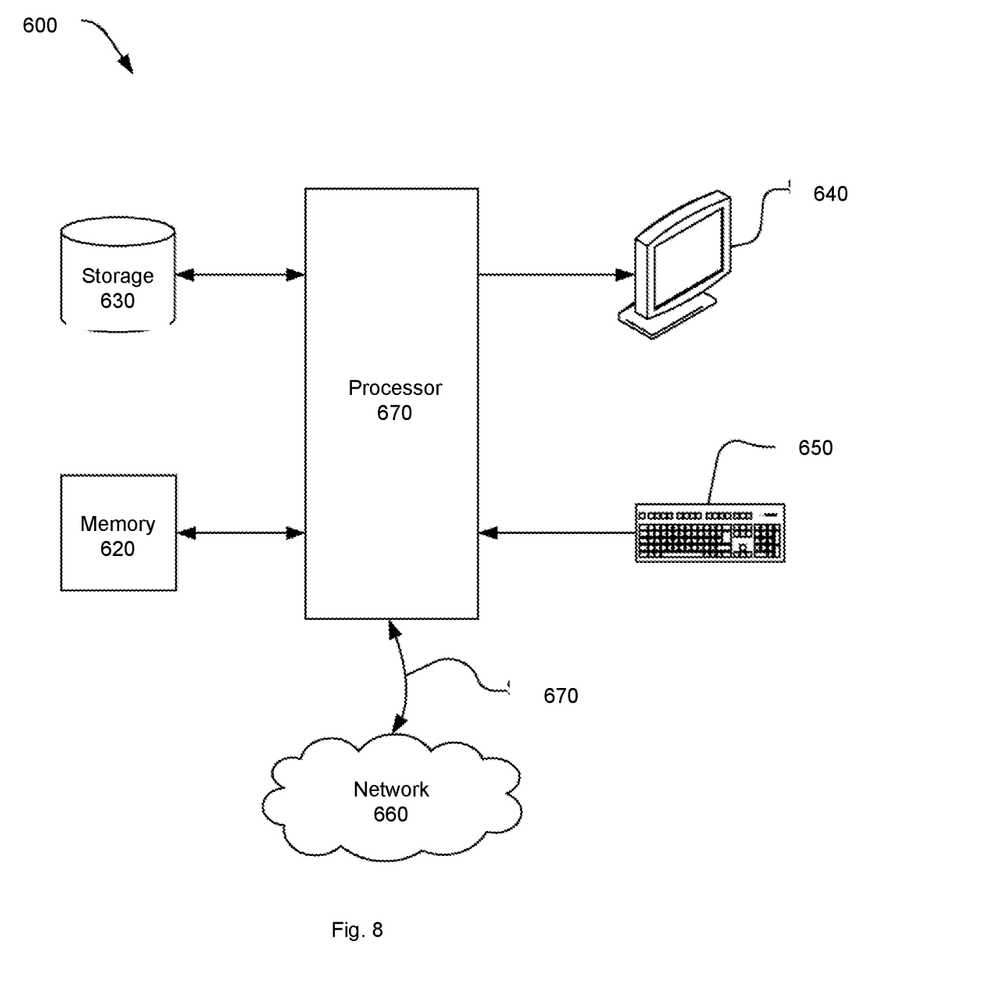
FIG. 8 is a block diagram of a computing device according to an example embodiment.

FIG. 8 is a block diagram of a computing device 600 which may be suitable for use as the client computer 510 and/or the server 520 of FIG. 7. The computing device 600 may include a processor 610 coupled to memory 620 and a storage device 630. The processor 610 may include one or more microprocessor chips and supporting circuit devices. The storage device 630 may include a machine readable storage medium as previously described. The machine readable storage medium may store instructions that, when executed by the processor 610, cause the computing device 600 to perform some or all of the processes described herein.

The processor 610 may be coupled to a network 660, which may be or include the Internet, via a communications link 670. The processor 610 may be coupled to peripheral devices such as a display 640, a keyboard or some type of input device 650, and other devices that are not shown.

The invention claimed is:

1. A method for detecting shared audio content between first audio content information being associated with a first set of fingerprints and second audio content information being associated with a second set of fingerprints, the method comprising:
    calculating a first matching score between a fingerprint of the first set and a fingerprint of the second set using a first matching algorithm, wherein the fingerprint of the first set and the fingerprint of the second set forms a first pair,
    calculating a second matching score for at least one second pair of fingerprints in the first set of fingerprints,
    clustering fingerprints associated with at least one second matching score that satisfies a cluster threshold into a clustered group, such that each clustered group comprises at least two fingerprints associated with a second pair having a second matching score satisfying the cluster threshold, and
    determining if the first audio content information shares audio content with the second audio content information at least based on the first matching score and information associated with the clustered group(s).

2. The method as defined in claim 1, wherein the second matching score is calculated using a second matching algorithm.

3. The method as defined in claim 1, further comprising grouping at least one optionally remaining fingerprint that is not part of a clustered group into a non-clustered group, such that the at least one non-clustered group comprises a single fingerprint having no associated second matching scores satisfying the cluster threshold, and wherein
    determining if the first audio content information shares audio content with the second audio content information is further based on information associated with the non-clustered group(s).

4. The method as defined in claim 3, further comprising deriving a group matching score for at least one clustered or non-clustered group based on the first matching scores associated with the fingerprint(s) of each clustered or non-clustered group that satisfies a first threshold, and wherein
    determining if the first audio content information shares audio content with the second audio content information is further based on said group matching score.

5. The method as defined in claim 3, wherein determining if the first audio content information shares audio content with the second audio content information is executed by:
    deriving a confidence score based on the fingerprints of the at least one clustered group or non-clustered group and at least one fingerprint of the second set, and
    determining that the first audio content information shares audio content with the second audio content information provided that said confidence score satisfies a confidence threshold.

6. The method as defined in claim 1, wherein at least one further second pair of fingerprints of each clustered group have one fingerprint in common with at least one other second pair of said clustered group.

7. The method as defined in claim 1, wherein each clustered group comprises only fingerprints having an associated first matching score satisfying the first threshold.

8. The method as defined in claim 3, wherein each non-clustered group comprises only fingerprints having an associated first matching score satisfying the first threshold.

9. The method as defined in claim 1, wherein the first audio content information relates to a query audio file, and wherein the second audio content relates to a single reference audio file, or vice versa.

10. The method as defined in claim 1, wherein the first matching algorithm or the second matching algorithm is related to a K-means calculation, hierarchical clustering, pairwise distance in metric space of the associated fingerprints.

11. The method as defined in claim 1, wherein the first matching algorithm is arranged to give a higher first matching score if the associated fingerprint of the first set and fingerprint of the second set are associated with the same frequency band.

12. The method as defined in claim 1, wherein the cluster threshold is based on
    a maximum distance between the two compared fingerprints of the first set; or
    a threshold distance from a common point in the fingerprint space.

13. The method as defined in claim 4, wherein at least one clustered or non-clustered group matching score is derived by either,
    selecting the first matching score having the largest value of each group;
    averaging the first matching scores of each group, or
    aggregating the first matching scores of each group.

14. A method for detecting shared audio content between a first audio content information being associated with a first set of fingerprints and a second audio content information being associated with a second set of fingerprints, the method comprising:
    calculating a first matching score between a fingerprint of the first set and a fingerprint of the second set using a first matching algorithm, wherein the fingerprint of the first set and the fingerprint of the second set forms a first pair,
    clustering fingerprints of the first set and second set into at least one clustered group, wherein each clustered group comprises at least one first pair of fingerprints having an associated first matching score satisfying a cluster threshold, and wherein each further first pair of fingerprints of each clustered group have one fingerprint in common with at least one other first pair of said clustered group, and
    determining if the first audio content information shares audio content with the second audio content information at least based on the first matching score and information associated with the clustered group(s).

15. A non-transitory computer readable storage medium having instructions stored thereon that, when executed by a computing device, cause the computing device to detect shared audio content between first audio content information being associated with a first set of fingerprints and second audio content information being associated with a second set of fingerprints, by:

- calculating a first matching score between a fingerprint of the first set and a fingerprint of the second set using a first matching algorithm, wherein the fingerprint of the first set and the fingerprint of the second set forms a first pair,
- calculating a second matching score for at least one second pair of fingerprints in the first set of fingerprints,
- clustering fingerprints associated with at least one second matching score that satisfies a cluster threshold into a clustered group, such that each clustered group comprises at least two fingerprints associated with a second pair having a second matching score satisfying the cluster threshold, and
- determining if the first audio content information shares audio content with the second audio content information at least based on the first matching score and information associated with the clustered group(s).

16. A non-transitory computer readable storage medium having instructions stored thereon that, when executed by a computing device, cause the computing device to detect shared audio content between a first audio content information being associated with a first set of fingerprints and a second audio content information being associated with a second set of fingerprints, by:

- calculating a first matching score between a fingerprint of the first set and a fingerprint of the second set using a first matching algorithm, wherein the fingerprint of the first set and the fingerprint of the second set forms a first pair,
- clustering fingerprints of the first set and second set into at least one clustered group, wherein each clustered group comprises at least one first pair of fingerprints having an associated first matching score satisfying a cluster threshold, and wherein each further first pair of fingerprints of each clustered group have one fingerprint in common with at least one other first pair of said clustered group, and
- determining if the first audio content information shares audio content with the second audio content information at least based on the first matching score and information associated with the clustered group(s).

* * * * *